United States Patent [19]

Bahler et al.

[11] 4,425,612

[45] Jan. 10, 1984

[54] POWER SUPPLY WITH LOAD-TRANSIENT ANTICIPATION

[75] Inventors: David D. Bahler, McLean, Va.; Ricardo E. Calvo, Austin, Tex.

[73] Assignee: International Business Machines Corporation, Armonk, N.Y.

[21] Appl. No.: 377,531

[22] Filed: May 12, 1982

[51] Int. Cl.³ .................................................. H02P 13/22
[52] U.S. Cl. ......................................... 363/21; 307/40; 323/283; 363/80
[58] Field of Search ........................ 363/21, 70, 71, 79, 363/80; 307/34, 38, 40; 361/152; 323/283

[56] References Cited

U.S. PATENT DOCUMENTS

| | | | |
|---|---|---|---|
| 4,084,103 | 4/1978 | Burns et al. | 307/132 |
| 4,128,771 | 12/1978 | Domenico | 323/283 |
| 4,245,319 | 1/1981 | Hedges | 307/38 |
| 4,274,132 | 6/1981 | Molyneux-Berry | 363/21 |
| 4,301,497 | 11/1981 | Johari | 363/21 |
| 4,336,462 | 6/1982 | Hedges et al. | 307/38 |

FOREIGN PATENT DOCUMENTS 54-129456 10/1979 Japan ..................................... 363/21

*Primary Examiner*—William H. Beha, Jr.
*Attorney, Agent, or Firm*—Douglas H. Lefeve

[57] ABSTRACT

The varying loads to which a power supply is subjected are anticipated before being placed across the power supply output by deriving device selection, direction of load change, and timing data from the control data transmitted to the load. The "on" and "off" times of the power transformer primary switch in a switching regulator power supply are adjusted for optimum power supply response to the changed load. The calculations and adjustment are made before any load change has occurred and the proper control signals to the switching regulator power supply are applied prior to or simultaneous with the load change.

11 Claims, 3 Drawing Figures

POWER SUPPLY WITH LOAD-TRANSIENT ANTICIPATION

DESCRIPTION

1. Technical Field

This invention relates generally to power supplies for generating regulated DC voltages and more particularly, to power supplies having switching regulators controllable to produce constant DC voltages with significant load variations.

2. Background Art

Representative of the closest prior art is U.S. Pat. No. 4,084,103 to W. W. Burns, III, et al, filed June 7, 1977, issued Apr. 11, 1978, entitled "System-State and Operating Condition Sensitive Control Method and Apparatus for Electric Power Delivery Systems" and U.S. Pat. No. 4,301,497 to G. C. Johari, filed June 16, 1980, issued Nov. 17, 1981, entitled "Flyback Converter Control With Feed Forward".

Switching regulator DC power supplies have commonly been utilized for providing regulated DC voltages to computers and computer peripherals which contain electro-mechanical devices such as DC servos and stepper motors. The inductive nature of these electro-mechanical loads causes severe transient power demands to be made of the power supply during the activation or deactivation of the devices. In order to maintain a regulated output voltage during these inductive load changes, it is desirable to provide a control scheme for the power supply capable of responding quickly to the changes.

U.S. Pat. No. 4,301,497 is an example of a switching regulator power supply of the flyback converter type. The power supply described in that patent combines the use of feedback and feed forward sensing and correction techniques to control the "on" and "off" times of a switch in series with the power transformer primary to provide a regulated voltage despite changes in the load and/or changes in the supply voltage to the input of the power supply. The feedback signal senses a rise or fall in the output voltage of the power supply and is used as one of the controls of the power transformer primary switch to control this output voltage in a closed loop fashion. Similarly, the feed forward correction technique involves sensing the voltage with which the power supply is being driven to lengthen the "off" time of the power transformer primary switching transistor in view of a rising power supply input voltage and to decrease the "off" time of the primary switch in view of a decreasing power supply input voltage.

In switching regulator power supplies of the type described above there are practical limitations in the speed with which corrections can be made to respond to transients. Large output filter capacitors can be used in these power supplies to dampen the effects of these transients on the output voltage but additional filter capacitance adds weight, costs, and volume to the power supplies.

U.S. Pat. No. 4,084,103 describes a method and apparatus for determining a precise switching sequence for the power switching elements of a switching regulator power supply for providing corrections for transients within a single cycle of switching control. The hardware required for implementation of the method described by that patent, however, exceeds the amount allowable for many general commercial applications. Also, this power supply controller is required to wait until after a transient has occurred before any corrective action is taken.

It would, therefore, be very desirable to provide an improved switching regulator power supply having superior response to wide load variations without the requirement for either extensive, complex hardware or unusually large filter capacitors.

DISCLOSURE OF INVENTION

In accordance with this invention the varying loads to which the power supply is subjected are anticipated before being placed across the power supply output. The "on" and "off" times of the power transformer primary switch are adjusted for optimum power supply response to the changed load. The calculations and adjustment can be made before any load change has occurred and the proper control can be applied prior to or simultaneous with the load change.

This invention is especially adaptable in power supplies utilized for supplying regulated DC voltages to electro-mechanical devices in data processing systems. These devices, for example, printers, are usually controlled by a digital control bus containing information which completely describes the future condition of the electrical loads created by operation of the electro-mechanical devices in the machine being powered. In this invention the digital information applied via the digital control bus to the load is used to calculate the proper sequence and duration of a single "on-off" cycle of the one or more switches in the switching regulator power supply to obtain the optimum transient response. The controller for the switching regulator switching device can operate in a conventional (for example, pulse width modulator) mode during steady state operation and revert to the transient anticipation aspect of control only just before and during load changes. This load transient anticipation eliminates the need for unusually large output filter capacitors that, in the past, have often been used to filter transients. This is because transient suppression with this invention, becomes a integral part of the control loop.

The foregoing and other objects, features, extensions, and advantages of the invention will be apparent from the following more particular description of the preferred embodiments of the invention, as illustrated in the accompanying drawing.

BEST MODE FOR CARRYING OUT THE INVENTION

Figure 1:
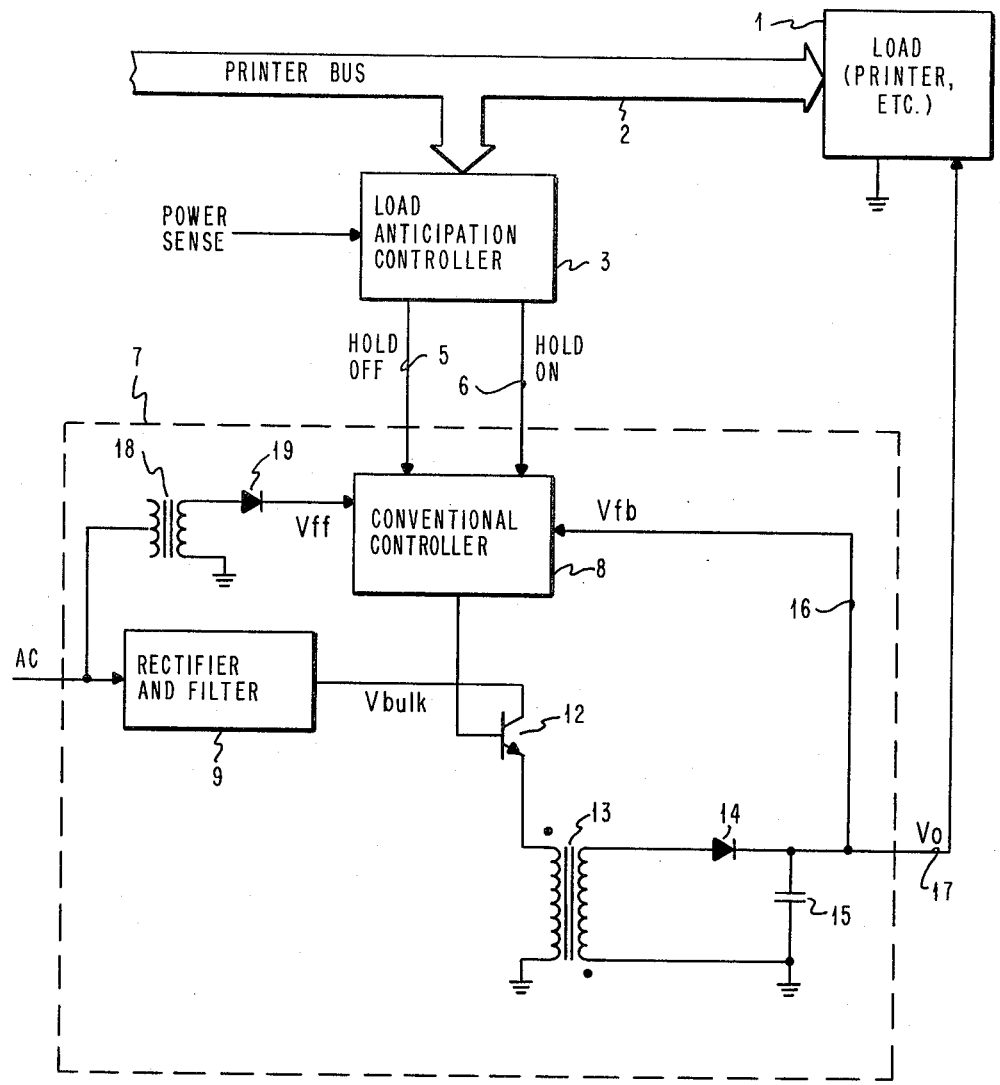
FIG. 1 is a block diagram which shows a load device in a data processing system which receives power from a power supply incorporating load anticipation control for proper regulation thereof.

Referring now to FIG. 1 a load device 1 is powered by the output voltage VO on line 17 from a switching power supply 7. For the purposes of this illustration the load device is assumed to be a printer, although it will be understood that power supplies delivering power to other load devices can be similarly regulated in accordance with this invention. The printer denoted as load 1 is a component of a data processing system which receives binary codes representative of alphanumeric characters to be printed along a printer bus 2. These binary codes representative of alphanumeric codes to be printed are conveyed along the printer bus 2 from well known printer control logic (not shown) which is not included in this invention. Also connected to the printer bus 2, is a load anticipation controller 3 for assistance in the regulation of power supply 7, as is explained in more detail hereinafter.

Load 1 may be representative of any load which reacts to particular data or other stimuli applied thereto to present a substantially predictable power requirement. The printer was chosen as an example of the type of device contemplated for load 1 because a data processing system printer presents a variety of predetermined loads in executing various ones of the possible commands that may be applied thereto. The execution of a carrier return command may present a first load. The printing of a comma character "," may present a second load. The printing of an "M" may present a third load, etc. In practice, the printer may present various loadings on several input DC voltages applied thereto. For the purposes of simplicity in this description, only one DC voltage is shown as being applied to the printer, although those skilled in the art will understand the application of this invention to power supplies having multiple outputs to supply loads having multiple voltage requirements.

The representative power supply 7 shown in FIG. 1 generally includes a combination of prior art regulation techniques such as those taught by the Johari U.S. Pat. No. 4,301,497, referenced above. An AC voltage is applied to a rectifier and filter 9 to produce an unregulated DC voltage, V bulk, which is applied to the collector of a switching transistor 12. The emitter of the switching transistor 12 is connected to the primary of a power transformer 13. The other end of the primary of the power transformer 13 is connected to ground. The secondary circuit of the power transformer 13 is connected in a flyback configuration including the rectification diode 14 and filter capacitor 15.

The conventional controller circuit 8 receives a feedback voltage, Vfb, along line 16 from the output of the power supply. The controller 8 also includes a feed forward signal, Vff, from the output of transformer 18 through the diode rectifier 19. Thus, the controller 8 is presented with signals representative of changes in the unregulated AC input signal in the form Vff, and in the regulated output signal in the form Vfb. From these input signals the base of switching transistor 12 is driven on and off, as appropriate, in an attempt to maintain a substantially constant output voltage VO.

The conventional controller 8 may take any of a variety of forms known in the prior art. Thus, the controller 8 may comprise a pulse width modulator operating at a constant frequency to vary the ratio of the on and off times of transistor 12, although other controllers could also be employed. Some of the other types of controllers available operate with (a) constant on-time/variable frequency, (b) constant off-time/variable frequency, and (c) variable time and variable frequency.

Line 5 from the load anticipation controller 3 to the conventional controller 8 is operable to override the "normal" command of the controller 8 to cause the switching transistor 12 to be held in an off state, regardless of the conventional decision of controller 8. Likewise, line 6 from the load anticipation controller 3 to the controller 8 is operable to cause switching transistor 12 to be held in an on state regardless of the conventional decision of the controller 8. Thus, the function of the load anticipation controller 3 is to monitor the current electrical load being presented by load 1, compare this load to the load requirement for execution of a predetermined command at a predetermined future time, and override the conventional controller 8 to force the power supply 7, through the proper on-off control of transistor 12, to make available to load 1, at the proper predetermined time, the amount of power required for execution of the code.

Figure 2:
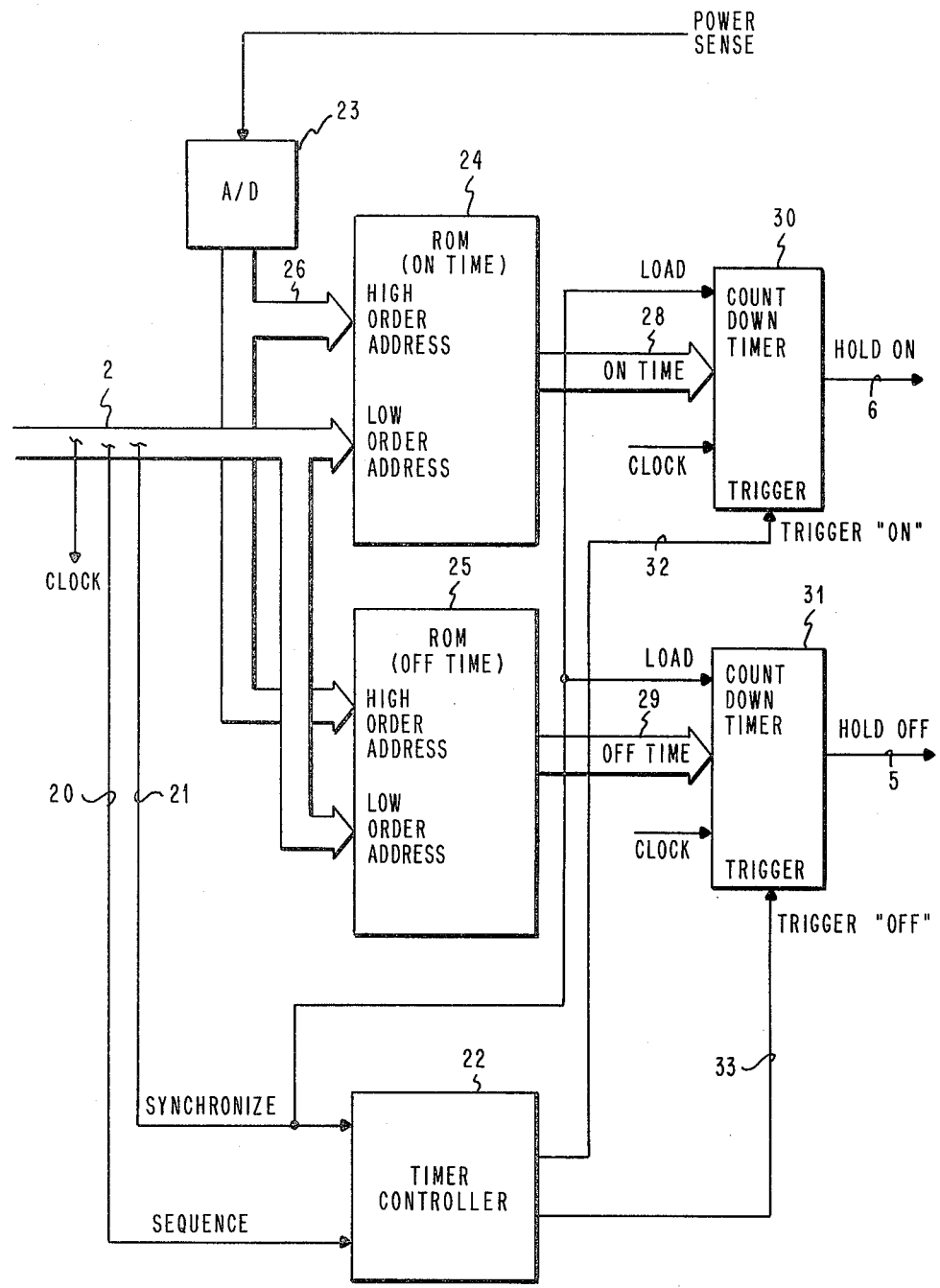
FIG. 2 is a diagram of a circuit for producing the load anticipation control of this invention for controlling the operation of a switching power supply.

Referring now to FIG. 2 data bytes from the printer bus 2 are sampled by the load anticipation controller. The data bytes on the printer bus 2 contain information concerning the future state of the loads. That is, these data bytes include information relative to what loads are to change, whether this change will be an increase or a decrease in loading, and when the load will change. More specifically, in an eight bit byte appearing on printer bus 2, the lowest order three bits, for example, are referred to as the device selection bits and indicate the type of change in the loading which is to take place. In this example, if the lowest three bits in the byte are 110 this indicates that the character selection motor is the load which is to change, while a 010 indicates that the hammer is the load to change. Continuing this example, the fourth lowest order bit in the eight bit byte on the printer bus 2 is referred to as the sequence bit and the state of this bit indicates whether the load described by the device selection bits is to be added to the existing load or dropped from the existing load. In this example, a "0" sequence bit denotes a pending load increase (i.e., the load described by the device selection bits will be turned on in the future), while a 37 1" sequence bit denotes a pending load decrease. Additionally in this example, another bit (not necessarily a part of the eight bit byte) on the printer bus 2 is referred to as the synchronize bit, and the state of this bit is pulsed from a low state to a high state for a short duration by the printer control logic at the time that the load described by the device selection bits is to change. The load controlled by the printer control logic will be either increased or decreased coincident with the rising edge of the pulsed synchronize bit.

Figure 3:
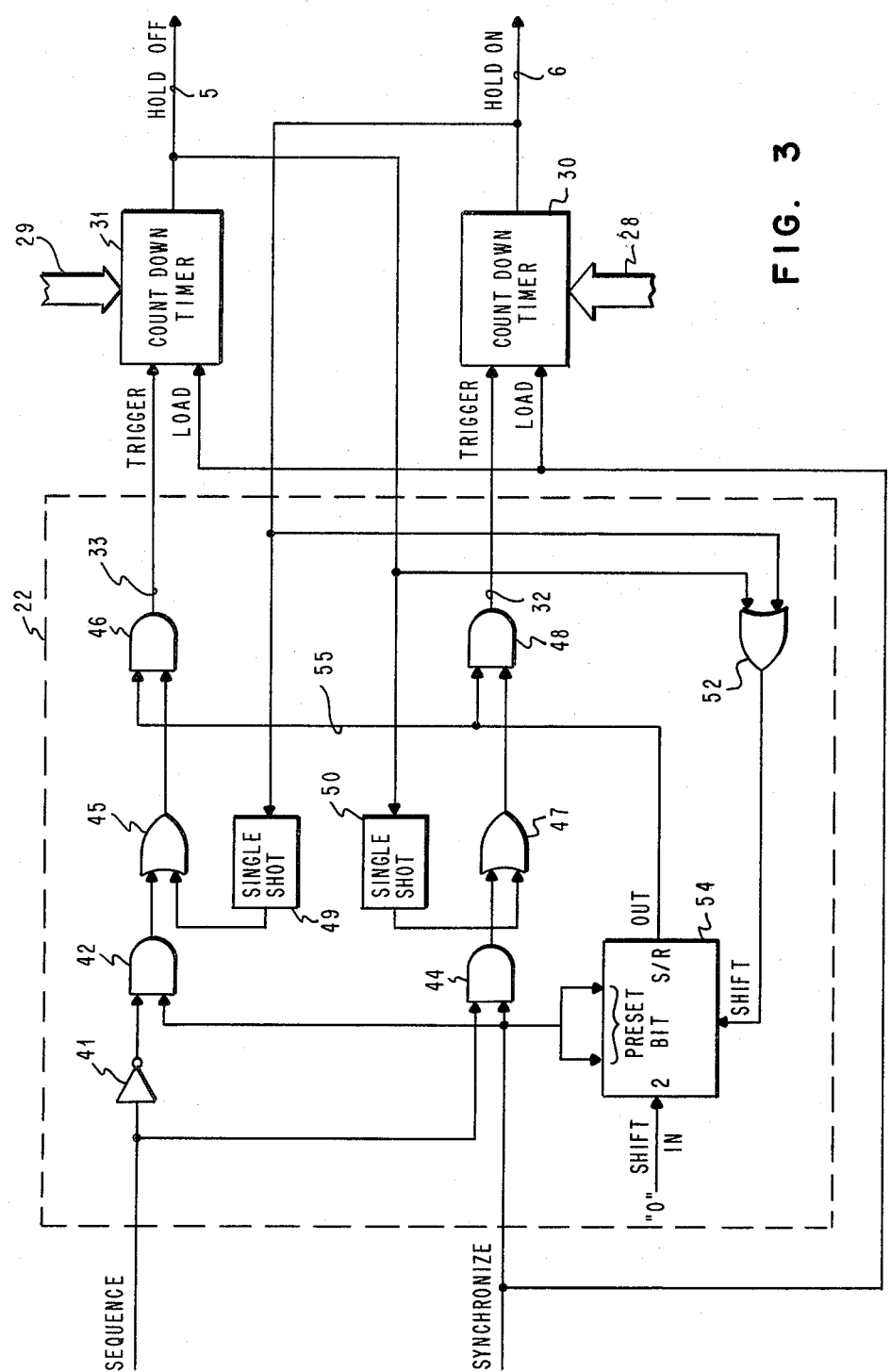
FIG. 3 is a diagram of the circuitry of the timer controller 22 of FIG. 2.

In FIG. 2 the sequence bit is conveyed from the printer bus 2 along line 20 to the timer controller circuit 22 which is described in detail relative to FIG. 3. Line 21 conveys the status of the synchronize bit from the printer bus 2 to the timer controller 22.

The four lowest order bits including the three device selection bits and the sequence bit comprise the low order read only memory (hereinafter, ROM) addresses for the tables stored in ROM 24 and ROM 25. The high order addresses for the tables stored in ROM 24 and 25 are output from an analog to digital (A/D) converter 23 and conveyed along the high order address bus 26 to ROM 24 and ROM 25. The A/D converter 23 is appropriately connected to the output of power supply 7, FIG. 1, to sense the amount of power output from power supply 7 presently being supplied to the load 1. The value of that amount of power is digitized by the A/D converter 23 and the digital representation of that amount of power represents the high order address in both of the read only memories 24 and 25 to appropriately address the tables therein.

The values stored at the table addresses in ROM 24 and ROM 25 are digital representations of time increments. With a particular combination of device selection bits and sequence bit on the printer bus 2 and a particular present power output from power supply 7, a particular storage location in each of the read only memories 24 and 25 will be addressed. The time increment stored at the addressed location in ROM 24 is conveyed along the on time bus 28 to preset a count down timer 30. Similarly, the time increment stored at the address location of ROM 25 is conveyed along the off time bus 29 to preset a count down timer 31. Thereafter, in accordance with the ENABLE ON signal on line 32 and the TRIGGER OFF signal on line 33 from the timer controller 32, and in synchronization with the CLOCK signals (which CLOCK signals may also, for example, be conveyed along bus 2) applied to the count down timers 30 and 31, HOLD ON and HOLD OFF signals are output from timers 30 and 31 for application in FIG. 1, lines 6 and 5, respectively to override the conventional controller 8 in its control of the switching of transistor 12 in the power supply 7.

The count down timers 30 and 31 are, therefore, operated as programmable single shots. They are enabled one at a time and in the proper sequence by the timer controller 22.

Referring now to FIG. 3 the circuitry of the timer controller 22 and its connections to the count down timers 30 and 31 are shown. In operation, the level of the sequence bit, applied to an input of AND gate 44 and INVERT 41 enables one of the AND gates 42 or 44. During the brief time period of the pulse from the synchronize bit the other of the two inputs of AND gates 42 and 44 are enabled. Additionally, the pulse from the synchronize bit is applied to the LOAD terminals of count down timers 30 and 31 to cause these timers to be loaded with the contents of the storage locations presently being addressed in read only memories 24 and 25, respectively.

The pulse from the synchronize bit also presets both storage positions of the 2 bit shift register 54 with binary "1" values. The output of shift register 54 is conveyed along line 55 to one input of each of AND gates 46 and 48. This shift register 54 output is at a high level whenever the highest order bit position therein is a binary "1" value.

Assuming, for this example, that the sequence bit applied to INVERT 41 is a zero, or low level, AND gate 42 provides a high output at the time of the pulse from the synchronize bit and this high level is gated through OR gate 54 and through the previously enabled AND gate 46 to trigger count down timer 31 to start counting down to zero in synchronism with the CLOCK pulses applied thereto. During this count down time the HOLD OFF output of the count down timer 31 is at a high level. Had the sequence bit been a one, a high level output from AND gate 44 would have been gated through OR gate 47 and AND gate 48 to cause the count down timer 30 to have been the first of the two count down timers to begin counting down.

When the output of the first of the two count down timers to count down goes to an up level, the up level is gated through OR gate 52 to the SHIFT input of shift register 54. This causes a present "0" to be shifted into the lowest order bit position of shift register 54, and the "1" bit which previously occupied the lowest order bit position is shifted to the highest order bit position in the 2 bit shift register 54.

When count down timer 31 reaches zero the negative going transition of the output signal thereof returning to a low level causes single shot 50 to provide an output pulse which is gated through OR gate 47 to begin the count down of timer 30. During the timer that timer 30 is counting down the HOLD ON output thereof is at a high level. Had count down timer 30 been the first of the two count down timers to be operated, the negative going transition of its output, at the time that the level on the HOLD ON output returned to a low level, would have caused single shot 49 to provide a pulse which would have been gated through OR gate 45 to start the count down of timer 31.

When the output of the second of the two count down timers to count down goes to an up level, the up level is gated through OR gate 52 to the SHIFT input of shift register 54. This causes another present "0" to be shifted into the lowest order bit position of shift register 54, and the "0" bit which previously occupied the lowest order bit position is shifted to the highest order bit position in the 2 bit shift register 54. At this time, the output of shift register 54 on line 55 goes low and the outputs of the count down timers can no longer trigger each other through the paths of the single shots.

Thus, a power supply system has been shown including load anticipation control for use in an environment wherein a power supply is subjected to varying loads which are anticipated before being placed across the power supply output. The "on" and "off" times of the power transformer primary switches are adjusted for optimum power supply response to the varying load.

While the invention has been particularly shown and described with reference to a preferred embodiment thereof, it will be understood by those skilled in the art that foregoing and other changes in form and details may be made therein without departing from the spirit and scope of the invention.

We claim:

1. In a system utilizing a controllable power supply and a variable load device, said device presenting one of a plurality of predetermined loads across an output of said power supply in accordance with the reaction of said load device to particular data applied thereto, the improvement comprising:
    means for sampling said data applied to said load device before said reaction of said load device to said data; and
    means responsive to said sampled data for controlling said power supply to effect a future transfer of greater or lesser power to said load device at the time of said reaction to achieve the application of a relatively constant voltage across said load device throughout said reaction.

2. In the system of claim 1 wherein said controllable power supply includes a switching device controllable alternately to assume an "on" state or an "off" state in accordance with one or more control means.

3. In the system of claim 2 wherein said means for controlling further comprises means for sampling the present power being delivered from said power supply to said load device before said future transfer takes place.

4. In the system of claim 3 wherein said means for sampling the present power further comprises means for converting an analog value of said present power to a digital value of said present power.

5. In the system of claim 4 wherein said means for sampling said data further comprises decoding means for sampling a digital data bus, said data bus connected to said load to control the operation of said load by application therealong of digital bytes of data, said bytes including certain bit positions indicating the type of action to be performed by said load device and another bit position indicative of whether said action to be performed will represent an increase or decrease of power output from said power supply.

6. In the system of claim 5 wherein said means for controlling further comprises means responsive to said digital value of said present power and to the binary values of said certain bit positions and said another bit position for determining a single "on" time duration and a single "off" time duration for one cycle of said switching device.

7. In the system of claim 6 wherein said means for controlling further comprises means responsive to the binary value of said certain bit positions and said another bit position for determining whether said "on" time duration of said switching device is to be effected immediately before or immediately after said "off" time duration.

8. In the system of claim 7 wherein said decoding means is further responsive to a synchronize signal on said data bus, said synchronize signal changing from a first binary value to a second binary value in relation to the time at which said increase or decrease of power output is to occur.

9. In the system of claim 8 wherein said one cycle of said switching device is begun responsive to said change of said binary value of said synchronize signal from said first binary value to said second binary value.

10. In the system of claim 9 wherein said means for determining further comprises a table stored in a read-only-memory.

11. A method operable with a controllable power supply and a variable load device, said load device presenting one of a plurality of predetermined loads across an output of said power supply in accordance with the reaction of said load device to particular data applied thereto, comprising:
sampling said data applied to said load device before said reaction of said load device to said data; and
controlling said power supply responsive to said sampled data to effect a future transfer of greater or lesser power to said load device at the time of said reaction to achieve the application of a relatively constant voltage across said load device throughout said reaction.

* * * * *